United States Patent [19]

Schneberger et al.

[11] Patent Number: 5,736,470
[45] Date of Patent: Apr. 7, 1998

[54] PRESSURE SENSITIVE ADHESIVE ARTICLE AND METHOD OF MAKING

[75] Inventors: Gary E. Schneberger, Ocala; Patrick J. Lamb; Edward H. Ransom, both of Tarpon Springs, all of Fla.

[73] Assignee: Omega Research, Inc., Tarpon Springs, Fla.

[21] Appl. No.: 668,341

[22] Filed: Jun. 25, 1996

[51] Int. Cl.⁶ .................................................. C09J 7/02
[52] U.S. Cl. .................. 442/151; 156/295; 428/317.1; 428/354
[58] Field of Search .................... 428/317.3, 354, 428/317.1; 156/145, 295; 442/151

[56] References Cited

U.S. PATENT DOCUMENTS

| | | | |
|---|---|---|---|
| 1,944,834 | 1/1934 | Bennett | 428/354 |
| 2,860,081 | 11/1958 | Eiken | 428/354 |
| 3,734,816 | 5/1973 | Swasey | 428/354 |
| 4,615,697 | 10/1986 | Robinson | 428/354 |
| 4,630,603 | 12/1986 | Greenway | 428/354 |
| 5,458,938 | 10/1995 | Nygard | 428/354 |

*Primary Examiner*—Jenna Davis
*Attorney, Agent, or Firm*—John S. Munday; Stephen G. Stanton

[57] ABSTRACT

A pressure sensitive adhesive article comprising a pressure sensitive adhesive layer and a porous layer affixed to the adhesive layer. The porous layer includes pores sized to permit passage of the adhesive therethrough to render the pressure sensitive adhesive article adhesive. A method of making a pressure sensitive adhesive article by forming a pressure sensitive adhesive layer and attaching a porous layer on one side of the adhesive layer. The porous layer having pores sized to permit passage of the adhesive therethrough.

19 Claims, 2 Drawing Sheets

PRESSURE SENSITIVE ADHESIVE ARTICLE AND METHOD OF MAKING

FIELD OF THE INVENTION

The present invention relates to pressure sensitive adhesive articles. The invention specifically relates to those that include a porous layer overlying a pressure sensitive adhesive layer. The articles are non adhesive in the inactive state. In the active state, when the adhesive is extruded through the porous layer, the articles are rendered adhesive.

BACKGROUND OF THE INVENTION

Most relatively permanent adhesive articles, such as BAND-AID® brand bandages, wound dressings, floor covering tiles, U.S. Postal self-adhesive stamps, self-sealing envelopes, and weather stripping, require the removal of a protective covering or layer before use of the adhesive. This covering prevents inadvertent fastening to unintended places or locations. For example, U.S. Postal self-adhesive stamps are mounted on a backing sheet from which the stamps must be removed before fastening to an envelope.

The necessity of a protective backing increases manufacturing and material costs and also requires disposal of the removed backing. For example, U.S. Pat. No. 4,151,319, to Sackoff, describes a method of making a pressure sensitive adhesive coated laminate. A paper backing sheet is coated with a silicone or other release material, on to which a pressure sensitive adhesive is added, then dried and cured if necessary, followed by the addition of a facing layer that is bonded to the adhesive layer under pressure to prepare the final product. To use the Sackoff device, one must remove the backing layer in a conventional way.

Similarly, U.S. Pat. No. 4,636,432 to Shibano et al discloses a supporting paper substrate, a release liner, a pressure sensitive adhesive layer, a second pressure sensitive layer that includes elastomer polymer microspheres, a release layer that includes starch type materials, and another release liner formed from a combination of the liner and release layer. To use the Shibano device, one must also remove the release liner in a conventional way.

U.S. Pat. No. 5,344,693 to Sunders describes a different device which has adhesive on at least one layer, where the adhesive layer also includes non-deformable spacing means such as bumps or posts that are not interconnected, and which have a non-adhesive contact surface. The Sunders device adheres to objects when the objects themselves are deformed into contact with the adhesive past the spacing means. The Sunders device requires that the objects to which the adhesive article is to be attached must be deformable. The deformation of such objects in order to contact the adhesive layer may create stresses in the objects which would tend to pull away or separate from the adhesive layer. Also, spurious material, such as dirt particles or fibers, may make unwanted contact and adhere to the relatively exposed adhesive, reducing or eliminating the effectiveness of the adhesive layer.

There are other prior devices and patents that do not require a backing or liner over the adhesive. However such adhesives are not relatively permanent in nature. Once the adhesive surface is exposed, these products will adhere to any surface on which they come into contact. For example, the ubiquitous POST-IT® brand notes and other like products do not require a separate protective backing over their adhesive although they are stacked upon one another. They will adhere to most surfaces to which they contact and are designed not to form a permanent adhesion to the surface to which they are attached. For example they may be affixed to and removed from documents as a convenient way of adding notes or comments without permanently defacing the document. These temporary, reversible adhesion products are not suited for many applications such as wound care, weather stripping, self-adhesive stamps, and self-sealing envelopes, to list a few, which require a more permanent adhesion.

U.S. Pat. No. 4,822,670 to Ono et al describes a removable adhesive sheet or tape having adhesive fine particles attached on at least one side of a substrate through a specific primer resin layer. This device appears to be a simple substrate with the specific adhesives described. The Ono device is removable so the adhesive is not relatively strong yet it will adhere to most surfaces on which it is placed in contact.

U.S. Pat. No. 5,372,865 to Arakawa et al describes the manufacture of a double sided pressure sensitive tape. Arakawa shows the basic tape having a substrate with a first pressure sensitive adhesive on one side and another adhesive on the other side. The double folded tape has the two layers adhering to each other and apparently can be easily separated when needed. While Arakawa does suggest that a release paper is not needed, the reason is that the pressure sensitive adhesive layers releasably adhere to each other. This suggests that the adhesives used are not relatively permanent, thus limiting its applicability. Further, since the two adhesive layers are essentially doubled over to contact each other to prevent unwanted adhesion to other surfaces, manufacturing costs are inherently greater than a device that does not have to be initially doubled upon itself.

Accordingly, it is an object of the present invention to provide a pressure sensitive adhesive article that does not require a removable protective backing or liner over the pressure sensitive adhesive to prevent relatively permanent inadvertent fastening to undesired surfaces.

Another object of this invention is to provide a pressure sensitive adhesive article which is less expensive to manufacture by eliminating the use of a removable protective backing or liner.

Yet another object of the present invention is to provide a unitary pressure sensitive adhesive article that will not adhere to surfaces until the adhesive is activated.

Still another object of the present invention is to provide an article that may be handled or otherwise contacted by other surfaces without adhering thereto unless and until the adhesive is activated.

Other objects will appear hereinafter.

SUMMARY OF THE INVENTION

It has now been discovered that the above and other objects of the present invention may be accomplished in the following manner. Specifically, the present invention provides a pressure sensitive adhesive article having a pressure sensitive adhesive layer affixed to a porous layer. The pores are sized to permit passage of some of the adhesive therethrough to expose the adhesive to permit adherence to an object. The degree or porosity as well as the type and thickness of the selected adhesive layer may be used to control the level of adhesion and degree of permanency. The porous layer of the adhesive article is placed in contact with a desired surface and adhesive is extruded through the pores of the porous layer to adhere the article to the surface.

A second porous layer may overlie the opposite side of the adhesive layer to provide a double sided pressure sensitive adhesive article. Alternatively a removable liner or backing film may overlie the opposite side of the adhesive layer to selectively provide a double or single sided pressure sensitive adhesive article. Additionally, a non removable liner or casting sheet, or a non porous layer, may overlie the opposite side of the adhesive layer to produce a single sided pressure sensitive adhesive article.

The adhesive layer may comprise conventional pressure sensitive adhesives such as vinyl copolymers; silicones; acrylic polymers, copolymers, and terpolymers; and rubber based adhesives and may further include viscosity increasing agents, hydrophilic agents, and fillers. The porous layer may comprise a woven or non-woven material, or a film of natural or synthetic composition and may further be formed from a perforated sheet of material. The layers may be hydrophilic to wick or absorb fluids and may also incorporate functional chemical or bioactive components, such as antimicrobials, bacteriostats, bioengineered products, viable cells, catalysts, dyes pigments, drugs, pest control chemicals, fragrances and preservatives for interaction or treatment of the desired surface and/or surrounding areas.

The method of making the article includes the steps of forming a pressure sensitive adhesive layer and attaching a porous layer on one or both sides of the adhesive layer. The porous layer has pores sized to permit passage of the adhesive therethrough.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
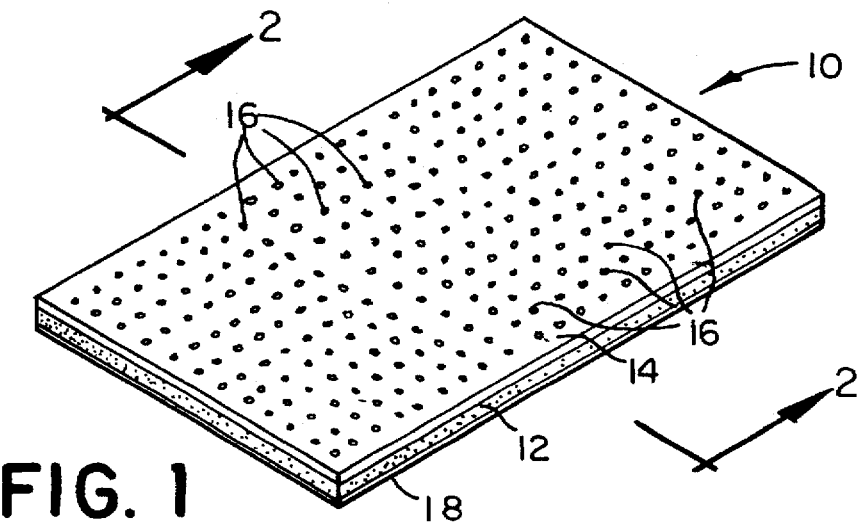
FIG. 1 is a perspective view of the pressure sensitive adhesive article in the inactivate state.

As shown in the drawings, a pressure sensitive adhesive article in accordance with the invention, generally shown as 10, includes a pressure sensitive adhesive layer 12, a porous layer 14 having pores 16 in a predetermined pattern therein, and a second layer 18 on the opposite side of adhesive layer 12. Pores 16 may also be arranged in a random pattern.

FIG. 1 shows article 10 in the inactive state having a predetermined pore pattern in porous layer 14. The pore size, pattern, and number may be selected to allow a desired adhesion to selected surfaces in relation to the amount of pressure to be applied and to the quantity or specific nature of the adhesive selected for the adhesive layer. Pores 16 may also be in a random pattern. Porous layer 14 may also include an area or areas without pores 16, for example in adhesive bandages where adhesion directly to wounds is to be avoided.

Figure 2:
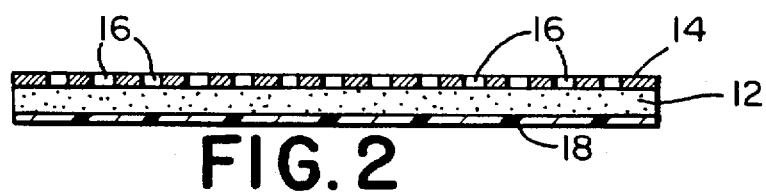
FIG. 2 is a sectional view taken along line 2, 2 of FIG. 1, showing the pressure sensitive adhesive article in the inactive state.
Figure 3:
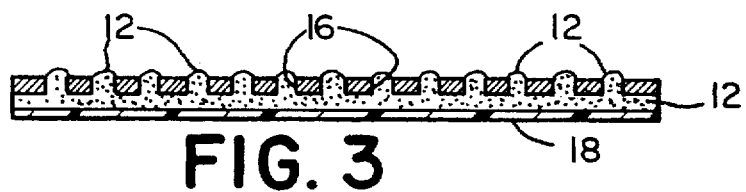
FIG. 3 is a sectional view similar to FIG. 2, showing the pressure sensitive adhesive article in the active state after extrusion of some of the adhesive.
Figure 5:
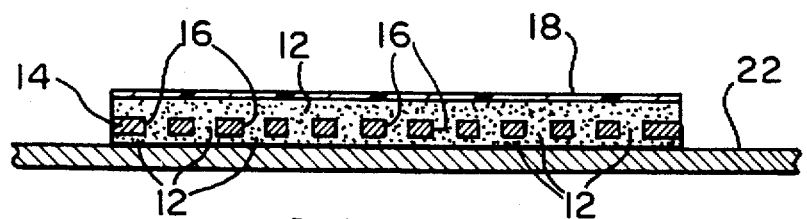
FIG. 5 is a sectional view taken along line 5, 5 of FIG. 4 showing extrusion of some of the adhesive along the porous layer surface of the pressure sensitive adhesive article.
Figure 6:
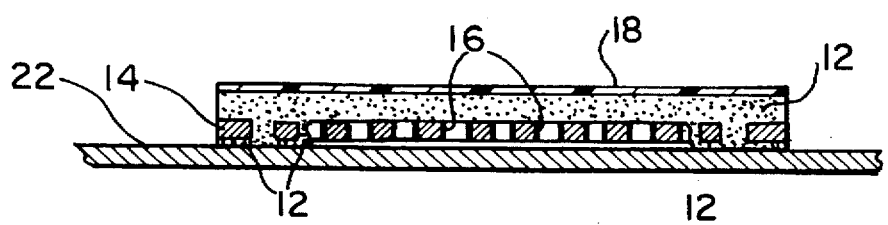
FIG. 6 is a sectional view similar to FIG. 5 showing extrusion of some of the adhesive along the periphery of the porous layer surface of the pressure sensitive adhesive article.

FIG. 2 is a sectional view taken along line 2, 2 of FIG. 1 prior to the extrusion of adhesive. As shown in FIG. 3, after pressure is applied against second layer 18, some of adhesive layer 12 is extruded through pores 16. The article will thereafter adhere to the desired surface to which it is applied. It can be appreciated that the greater the pressure exerted and the greater the surface area of the article to which pressure is applied, the greater the amount of extruded adhesive 12 will be available to adhere to the desired surface. Alternatively, pore size and the viscosity of the adhesive 12 may be used to control the amount of adhesive extruded. As shown in FIGS. 5 and 6, extruded adhesive 12 flows laterally across the upper surface of porous layer 14 further increasing the adhesive bond.

Figure 4:
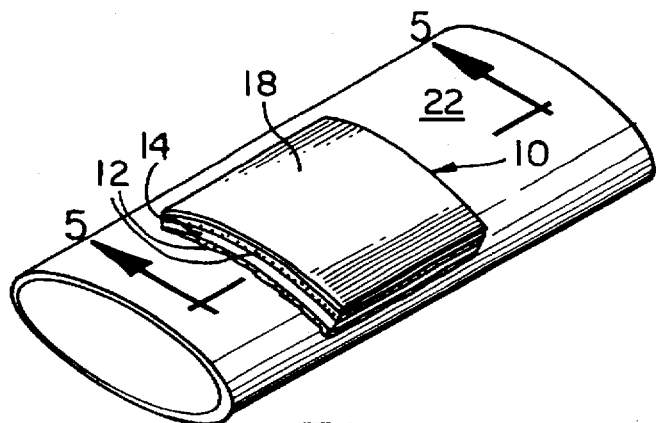
FIG. 4 is a perspective view of the pressure sensitive adhesive article of the present invention after application to a desired surface.

FIG. 4 shows the article adhered to a desired surface 22. While virtually any shaped surface may be used, the only limitation is that the adhesive selected be capable of adhering to the specific selected surface. The surface may be irregular or of any shape as the article of this invention may be cut or preformed for application to such a surface. If desired, the article may be conformable to surface irregularities.

FIG. 5 illustrates how extrusion of some adhesive 12 has occurred along substantially all of entire porous layer 14 through pores 16. Relatively uniform pressure was applied to the entire area of the article to cause extrusion of adhesive layer 12 through substantially all pores 16. The extruded adhesive 12 flows laterally from pores 16 to form an adhesive interface for maximum, uniform adherence of the article to desired surface 22.

FIG. 6 is a view similar to FIG. 5 except that extrusion of some of the adhesive 12 has occurred along the periphery of the article by the application of pressure only in a predetermined area or where adhesive is available, such as, for example, an adhesive bandage covering a wound. Extruded adhesive 12 again flows laterally from peripheral pores 16 to create an adhesive interface along the periphery to maximize adherence of the article to surface 22.

Figure 7:
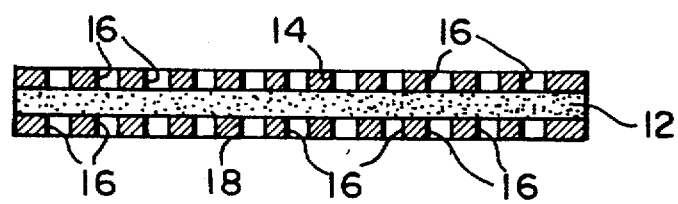
FIG. 7 is a sectional view similar to FIG. 2 showing an alternate embodiment of the pressure sensitive adhesive article of the present invention having two porous layers.

FIG. 7 shows an alternate embodiment of the present invention wherein second layer 18 is also porous. This alternate embodiment is useful as a double sided pressure sensitive adhesive article as pressure exerted on the article extrudes some of adhesive layer 12 through pores 16 of porous layers 14, 18 rendering each side of the article adhesive. It may be appreciated that a double sided pressure sensitive adhesive article may also comprise two separate adhesive layer/porous layer units joined at the respective adhesive layers. Thus, two adhesive layers having differing characteristics, such as degrees of adhesion or differing chemical or bioactive components, may be easily used to provide a double sided article having differing adhesive or other characteristics on either side.

In use, the article may be removed from any packaging, to maintain sterility for example, and is placed, porous layer 14 down, against desired surface 22. The article is usually conformable to surface 22. Adhesive 12 is then activated by applying pressure against second layer 18, for example, extruding some adhesive 12 through pores 16. Porous layer 14 may be deformable in which case the deformation facilitates attachment. Extruded adhesive 12 flows laterally from pores 16 to form an adhesive interface with desired surface 22. If adhesive layer 12 or porous layer 14 incorporate functional chemical or bioactive components, such components may then interact with or treat desired surface 22 and any surrounding areas. For example an antimicrobial treated adhesive 12/porous layer 14 would treat any infection on a wound over which the article is attached. Further, adhesive layer 12 and porous layer 14 may also be hydrophilic, and as such, any moisture or fluid may then be wicked or absorbed away from desired surface 22, for example, to aid draining of a wound.

The article is non adhesive in normal handling or processing, and becomes adhesive only upon the application of pressure. The greater the pressure applied, and the greater the area of the article to which the pressure is applied, the greater the total amount of adhesive 12 is extruded through pores 16 and thus the greater the adhesion. The number and size of pores 16 and the specific adhesives selected for adhesive layer 12 also determine the amount of total adhesive 12 extruded and the total adhesion.

Adhesive layer 12 may comprise conventional pressure sensitive adhesives such as: vinyl copolymers; silicones; acrylic polymers, copolymers, terpolymers; polyurethane, rubber based adhesives, and other natural or synthetic based adhesives. Porous layer 14 may comprise a woven or non-woven material, or a film of natural or synthetic composition and may be formed from a perforated sheet of material. As discussed above, adhesive layer 12 and porous layer 14 may be hydrophilic allowing absorption or wicking of fluids. Materials or compounds may be added to adhesive layer 12 and porous layer 14 for treatment of, or interaction with, surface 22 or surrounding areas by the release or discharge of chemicals or bioactive substances, such as, for example, antimicrobials, bacteriostats, bioengineered products, viable cells, catalysts, dyes pigments, drugs, pest control chemicals, fragrances and preservatives. Second layer 18 may comprise: a removable or non removable casting sheet or backing film; a porous or non porous fabric; or a porous or non porous film of natural or synthetic composition and may be formed from a perforated sheet of material. Like porous layer 14, second layer 18 may also be hydrophilic and include functional chemical compounds.

There are numerous other benefits of the article. For example an additional protective release liner is not required as is common in other similar commercial products thus simplifying and reducing manufacturing costs. Such an article also increases the ease of processing and handling as it is not adhesive until activated by the application of pressure against it. As such it is an article that provides adhesion on demand and allows the repositioning of the article during its initial use and application.

The novel article of the present invention ensures that adhesive will be extruded only upon application of pressure at those areas of the article where there are pores 16 and adhesive 12. Porous layer 14 (and 18) may be made from a variety of materials as long as its pores are sized to permit the extrusion of some of adhesive layer 12 therethrough. By selecting various pressure sensitive adhesives for adhesive layer 12 in combination with various porous layer material having varying pore sizes and patterns, a pressure sensitive adhesive article may be provided which requires anywhere from a relatively light pressure for adhesive extrusion, for wound dressings for example, or one which requires greater pressure for adhesive extrusion, for precise application against other surfaces for example. A non-adherent area or areas in layer 14 (or 18) may be provided by: elimination of adhesive layer 12; elimination of pores 16; or addition of a separate non porous masking material in the area or areas desired to be rendered non-adherent.

EXAMPLES

In a first example, a wet Flexbond™ vinyl copolymer pressure sensitive adhesive emulsion, manufactured by Air Products and Chemicals, Inc., was coated onto a silicone coated release liner. The emulsion was allowed to dry and then was laminated to a first porous non woven fabric layer. The release liner was removed and a second porous non woven fabric layer was laminated to the other side of the adhesive surface. The non woven fabric used was high density polyethylene Delnet X 530™ fabric, manufactured by Applied Extrusion Technologies, Inc. This first fabrication yielded a composite structure of porous non woven fabric/adhesive layer/porous non woven fabric which exhibited no adhesive tack of the article's exposed porous layers prior to the application of pressure.

In a second example, one part of Viscalex AT66™ material, manufactured by Allied Colloids Corporation, was added to ninety-nine parts of Flexbond 165™ emulsion, manufactured by Air Products and Chemicals, Inc., to increase the viscosity of the adhesive layer. The increased viscosity allowed the resulting adhesive to be coated directly onto a porous non woven fabric layer without striking through the fabric's pores, thus eliminating the need to use a release liner or backing film as a coating sheet to first dry the adhesive layer.

Other fabrications are also possible. Commercially available transfer adhesives, such as Number 1524™ Medical Transfer Adhesive available from the 3M Corporation, may be effectively employed to produce the adhesive layer. The adhesive layer may also incorporate adhesive tackifying resins, plasticizers, and solvents as well as hydrophilic components. The porous/non porous layers may be fabricated such that they differ in porosity or hydrophilic nature. The porous layer may be fabricated with varying degrees of porosity along its surface area to provide zones of differing porosity and therefore zones of differing degrees of extrusion with the same amount of pressure.

The pressure sensitive adhesive article of the present invention may be used in a wide variety of applications such as adhesive articles for medical use including bandages, surgical drapes, intravenous dressings, wound dressings, and self adhesive wound rolls. Additional applications include industrial, automotive, aerospace, military or consumer use such as floor covering adhesives, shock absorbent adhesive mounts, double sided adhesive articles, self adherent labels, self sealing envelopes, resealable bags, envelopes and containers, single and double faced adhesive tape, weather-stripping, thermal insulation, and sound insulation.

Articles made in accordance with the invention greatly facilitates use of such adhesive in a of applications. For example a weather stripping product fabricated in accordance with the present invention would allow precise measurement and cutting to fit the area to be weather stripped by allowing positioning and repositioning of the article directly on the desired surface for a match fit before pressure is applied. Emergency medical personal could carry one size temporary wound dressings made in accordance with the present invention which could be quickly cut on scene to size the dressing to specific wounds and could be applied in a manner to extrude adhesive only to the surface surrounding the wound. Such wound dressings would suffice until further medical treatment is rendered at a hospital or emergency room.

While particular embodiments of the present invention have been illustrated and described, it is not intended to limit the invention, except as defined by the following claims.

We claim:

1. A pressure activated adhesive article, comprising:

a pressure activated adhesive layer having a backing layer supporting an adhesive adapted to extrude under pressure; and a deformable porous layer overlying said adhesive layer opposite said baking layer and covering said adhesive; said porous layer having a predetermined thickness to prevent said adhesive from contacting surfaces in contact with said porous layer such that a portion of said thickness furthest from said adhesive is not filled with said adhesive;

said porous layer including pores sized to permit extrusion of said adhesive therethrough, whereby pressure applied to the article causes deformation of said porous layer and extrusion of said adhesive through said pores to render the article adhesive.

2. The article of claim 1, wherein said porous layer is selected from the group consisting of a woven porous fabric, a non woven porous fabric, and a porous film of natural or synthetic composition.

3. The article of claim 1, wherein said porous layer is formed from a perforated sheet of material.

4. The article of claim 1, wherein said adhesive is selected from the group consisting of vinyl copolymers, silicones, acrylic polymers, polyurethane and rubber based adhesives.

5. The article of claim 4, wherein said adhesive further includes a viscosity increasing agent.

6. The article of claim 1, wherein at least one of the said layers is hydrophilic.

7. The article of claim 1, wherein the article is conformable to a surface.

8. The article of claim 1, wherein at least one of said layers incorporates functional chemical or bioactive components.

9. The article of claim 8, wherein said chemical or bioactive components are selected from the group consisting of antimicrobials, bacteriostats, bioengineered products, viable cells, catalysts, dyes, pigments, drugs, pest control chemicals, fragrances and preservatives.

10. The article of claim 1, wherein said porous layer further includes at least one pore-free area providing at least one non adherent area.

11. The article of claim 1, wherein at least one said layer has a high vapor transmission rate.

12. The article of claim 1, wherein at least one said layer is highly permeable to gasses.

13. The article of claim 1, wherein said backing layer comprises a second deformable porous layer affixed to a second pressure activated adhesive layer, and wherein said backing layer is affixed to said second pressure activated adhesive layer by said second pressure activated adhesive layer.

14. The article of claim 1, wherein said backing layer comprises a porous non woven fabric and said porous layer comprises a non woven fabric.

15. The article of claim 14, wherein said article is made by:

coating a wet pressure activated adhesive emulsion onto a silicone coated release liner;

drying said wet adhesive emulsion;

laminating said dried adhesive emulsion opposite said release liner to said porous layer;

removing said release liner; and laminating said dried adhesive emulsion opposite said porous layer to said porous non woven fabric backing layer.

16. The article of claim 14, wherein said article is made by:

adding a viscosity increasing agent to a wet pressure activated adhesive emulsion to increase said emulsion's viscosity;

coating said thickened emulsion onto said porous layer without significant extrusion of said emulsion through said porous layer's pores; and laminating said adhesive emulsion opposite said porous layer to said porous non woven fabric backing layer without significant extrusion of said emulsion through said backing layer's pores.

17. The article of claim 1, wherein said adhesive also includes materials selected from the group comprising tackifying resins, plasticizers, and solvents.

18. The article of claim 1, wherein said porous layer has a porosity that varies along its surface area to form zones of differing porosity, wherein said applied pressure produces zones of differing levels of extrusion of said adhesive through said pores and hence differing zones of adhesion corresponding to said differing porosity zones.

19. A method of making a pressure activated adhesive article, the method comprising the steps of:

forming a pressure activated adhesive layer having an obverse side and a reverse side;

attaching a backing layer on said reverse side; and attaching a deformable porous layer overlying said obverse side, said porous layer having a predetermined thickness to prevent said adhesive from contacting surfaces in contact with said porous layer such that a portion of said thickness furthest from said adhesive is not filled with said adhesive; said porous layer including pores sized to permit extrusion of said adhesive therethrough.

* * * * *